United States Patent [19]
Lawton et al.

[11] Patent Number: 5,122,441
[45] Date of Patent: Jun. 16, 1992

US005122441A

[54] METHOD FOR FABRICATING AN INTEGRAL THREE-DIMENSIONAL OBJECT FROM LAYERS OF A PHOTOFORMABLE COMPOSITION

[75] Inventors: John A. Lawton, Landenberg, Pa.; Jerome T. Adams, Newark, Del.

[73] Assignee: E. I. Du Pont de Nemours and Company, Wilmington, Del.

[21] Appl. No.: 604,982

[22] Filed: Oct. 29, 1990

[51] Int. Cl.$^5$ .............................. G03C 9/08
[52] U.S. Cl. ........................... 430/320; 430/269; 430/394; 430/396; 156/58; 264/22; 425/174.4; 427/54.1
[58] Field of Search .............. 430/22, 269, 320, 321, 430/396, 394; 156/58, 59; 264/1.4, 1.7, 22; 425/174, 174.4; 427/54.1

[56] References Cited

U.S. PATENT DOCUMENTS

| | | | |
|---|---|---|---|
| 2,775,758 | 12/1956 | Munz | 343/17 |
| 4,575,330 | 3/1986 | Hull | 430/269 |
| 4,752,498 | 6/1988 | Fudim | 427/54.1 |
| 4,801,477 | 1/1989 | Fudim | 430/321 |

FOREIGN PATENT DOCUMENTS

| | | |
|---|---|---|
| 0250151 | 6/1987 | European Pat. Off. |
| 63-45540 | 2/1988 | Japan |

OTHER PUBLICATIONS

"Automatic Method for Fabricating 3-D Plastic Model with Photohardening Polymer", Kodama, H.; *Rev. Sci. Instrum.* 52(11), Nov. 1981, pp. 1770–1773.

"Principles of Electronic Packaging" Seraphimi, D. et al. ed., McGraw-Hill Book Co., 1989, pp. 374–376.

Alan J. Herbert, "Solid Object Generation", 1982, pp. 185–188.

A. J. Herbert, "A Review of 3D Solid Object Generation", 1989, pp. 186–190.

*Primary Examiner*—Marion E. McCamish
*Assistant Examiner*—Kathleen Duda
*Attorney, Agent, or Firm*—Thomas H. Magee

[57] ABSTRACT

An apparatus and method for fabricating integral three-dimensional objects from successive layers of photoformable compositions by exposing the layers of the composition through a semi-permeable film that allows creation of release coatings on the side of said film facing said composition.

12 Claims, 3 Drawing Sheets

METHOD FOR FABRICATING AN INTEGRAL THREE-DIMENSIONAL OBJECT FROM LAYERS OF A PHOTOFORMABLE COMPOSITION

FIELD OF THE INVENTION

This invention relates to production of three-dimensional objects by photoforming, and more particularly to the controlled application of thin flat liquid layers accurately and quickly to a platform or previously photoformed layer(s) to accomplish said production with layers of improved flatness, accuracy and integrity.

BACKGROUND OF THE INVENTION

Many systems for production of three-dimensional modeling by photohardening have been proposed. European patent application 250,121 filed by Scitex Corporation, Ltd. on Jun. 6, 1987, discloses a three-dimensional modeling apparatus using a solidifiable liquid, and provides a good summary of documents pertinent to this art.

These approaches relate to the formation of solid sectors of three-dimensional objects in steps by sequential irradiation of areas or volumes sought to be solidified. Various masking techniques are described as well as the use of direct laser writing, i.e., exposing a photohardenable composition with a laser beam according to a desired pattern and building a three-dimensional model layer by layer. In addition to various exposure techniques, several methods of forming thin liquid layers are described which allow either the coating of a platform initially or the successive coating of object layers previously exposed.

U.S. Pat. No. 4,575,330 (C. W. Hull), issued on Mar. 11, 1986 and later reexamined (certificate issued on Dec. 19, 1989), describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, wherein successive adjacent laminae, representing corresponding successive adjacent cross-sections of the object, are automatically formed and integrated together to provide a step-wise laminar buildup of the desired object, whereby a three-dimensional object is formed and drawn from a substantially planar surface of the fluid medium during the forming process. This patent also describes an embodiment in which a UV curable liquid floats on a heavier UV transparent liquid which is non-miscible and non-wetting with the curable liquid. In addition, this patent suggests the use of "water (or other) release coating" used in conjunction with a CRT and a fiber optic faceplate. Subsequent patent applications, made by Hull and his associates, published by the European Patent Office and listed in publication number 0 361 847 describe means of providing the thin layers of fluid more quickly using a doctor blade and of controlling the level in a vat of fluid.

U.S. Pat. Nos. 4,752,498 and 4,801,477 (E. V. Fudim) issued on Jun. 21, 1988 and Jan. 31, 1989 respectively, describe methods of forming three-dimensional objects, in which a sufficiently rigid transparent plate or film is placed in contact with a liquid photopolymer so as to hold the photopolymer surface to a desired shape, and preferably exclude air, during radiation curing through the transparent plate or film. It is further suggested that the surface of the transparent plate or film be made of a material which leaves the irradiated photopolymer surface capable of further crosslinking so that when a subsequent layer is formed it will adhere thereto. Fudim also suggests that this material be made of or contain in its molecules oxygen, copper or other inhibitors to aid in the release of the layer without distorting the solidified photopolymer.

Publication "Automatic Method for Fabricating a Three-Dimensional Plastic Model with Photohardening Polymer" by Hideo Kodama, Rev. Sci. Instrum. 52(11), 1770–1773, Nov. 1981, describes a method for automatic fabrication of a three-dimensional plastic model. The solid model is fabricated by exposing liquid photoforming polymer, of 2 mm thickness or less, to ultraviolet rays, and stacking the cross-sectional solidified layers. Publication "Solid Object Generation" by Alan J. Herbert, Journal of Applied Photographic Engineering, 8(4), 185–188, August 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory. A good review of the different methods is also given by a more recent publication, titled "A Review of 3D Solid Object Generation" by A. J. Herbert, Journal of Imaging Technology 15: 186–190 (1989).

Most of these approaches relate to the formation of solid sectors of three-dimensional objects in steps by sequential irradiation of areas or volumes sought to be solidified. Various masking techniques are described as well as the use of direct laser writing, i.e. exposing a photoformable composition with a laser beam according to a desired pattern and building a three-dimensional model layer by layer. In addition to various exposure techniques, several methods of forming thin liquid layers are described which allow both coating a platform initially and coating successive layers previously exposed and solidified.

Current methods of coating suggested thus far, however, have drawbacks in that they are not capable of ensuring flat uniform layer thickness or of producing such layers quickly, or they do not effectively prevent damage to previously formed layers during the successive coating process. Furthermore, they omit to recognize very important parameters involved in the coating process such as, for example, the effects of having both solid and liquid regions present during the formation of the thin liquid layers, the effects of fluid flow and rheological characteristics of the liquid, the tendency for thin photoformed layers to easily become distorted by fluid flow during coating, and the effects of weak forces such as, for example, hydrogen bonds and substantially stronger forces such as, for example, mechanical bonds and vacuum or pressure differential forces on those thin layers and on the object being formed.

The Hull patent, for example describes a dipping process where a platform is lowered either one layer thickness or is dipped below the distance of one layer in a vat then brought up to within one layer thickness of the surface of the photohardenable liquid. Hull further suggests that low viscosity liquids are preferable, but for other practical reasons, the photohardenable liquids are generally high viscosity liquids. Although theoretically most liquids will flatten out due to surface tension effects, high viscosity liquids and even low viscosity liquids take an inordinate amount of time to flatten to an acceptable degree especially if large flat areas are being imaged and if the liquid layer thickness is very thin. Regions where previous layers consist of solid walls surrounding liquid pools further compounds the flattening process of the thin liquid layer coating. In addition, motion of the platform and parts, which have cantilevered or beam (regions unsupported in the Z direction by previous layer sections), within the liquid creates deflections in the layers contributing to a lack of tolerance in the finished object. In the embodiment where a heavier transparent liquid is utilized to create the thin flat layers of photopolymer that float on the transparent liquid, there is significant reliance on surface tension effects to ensure that the photopolymer layer will be flat. Reliance on these surface tension effects and the difference in specific gravities between the two liquids in order to create the flat photopolymer layers is severely complicated by other surface tension effects, such as, for example, meniscus development at the corners of the hardened photopolymer, and object geometries that create enclosed areas which produce substantial suction cup type lifting of the heavier liquid during coating of subsequent layers. In the embodiment where "water (or other) release coating" is proposed for use in conjunction with a CRT and a fiber optic faceplate, the patent does not teach methods by which a release coating could be applied and maintained on the faceplate surface.

The Muntz patent (U.S. Pat. No. 2,775,758 issued in 1956) and Scitex application describe methods by which the photohardenable liquid is introduced into the vat by means of a pump or similar apparatus such that the new liquid level surface forms in one layer thickness over the previously exposed layers. Such methods have all the problems of the Hull methods except that the deflections of the layers during coating is reduced.

The Fudim patent describes the use of a transmitting material, usually rigid and coated with a film or inherently unlikely to adhere to the hardened photopolymer, to fix the surface of the photopolymer liquid to a desired shape, assumably flat, through which photopolymers of desired thickness are solidified. The methods described by Fudim do not address the problems inherent in separating such a transmissive material from a photopolymer formed in intimate contact with the surface of the transmissive material. Whereas the effects of chemical bonding may be reduced significantly by suitable coatings of inherently suitable films, the mechanical bonds along with hydrogen bonds, vacuum forces, and the like are still present and in some cases substantial enough to cause damage to the photopolymer during removal from the transmissive material surface. Furthermore, evaluations made by the Applicants indicate that the forces, resisting the separation or even sliding off the photohardenable material exposed in intimate contact with the suitably non-adhesive transmissive material, are capable of damaging the photoformed layer especially when surrounded by photohardenable liquid and even more especially when the photoformed layers are thin. No method is described in the Fudim patent to eliminate these problems.

In the Kodama (Kokai Patent No. SHO 56(1981)-144478, Japan, later published on Nov. 10, 1981) publication, mention is made of a Teflon, or polyethylene coated quartz plate, which coating acts as a releasing agent allowing the solidified resin to be easily removed from the base (quartz plate) and preferentially adhering to the constructing stand (aluminum sheet). This method would have all the difficulties mentioned in the Fudim reference above.

While it may be said that others such as Munz, Kodama, Cubital, Hull, etc. implicitly had air as the atmosphere at the interface of the photopolymer surface, air was not an element comprised within their specifications. And the presence, advantages, and uses of air in regions deeper into the compositions (also implicit in previous specifications) has not been specified though they are implicit.

In a thesis paper, published by the Department of Mechanical Engineering, University of Delaware, library catalogue date Aug. 14, 1990, there is mention of an unsuccessful effort, in which the author, Hirsch, studied the possibility of creating a porous fused silica plate through which the photopolymer could be exposed. The purpose of the porosity in the plate was to allow air to flow into the surface between the plate and the hardened layer to allow vacuum breaking when they were separated. It was also proposed that the air or oxygen passing through the plate might inhibit the polymerization at this surface aiding in release. This effort was unsuccessful primarily due to difficulties in obtaining a UV transparent porous plate material. But it also neglects concerns such as, for example, polymer adhesion to the fused silica in non-pore regions and eventual bridging of this polymer in subsequent coating applications which would close off the pores, the requirement for very small pore sizes which would severely restrict the air flow which is supposed to relieve the vacuum forces, and the lack of any driving forces or pressures to prevent the photopolymer from entering the pores or to push the air into the interface between the porous plate and the photopolymer surface.

One of the objects of the present invention is therefore to provide a method and apparatus for quickly producing layers of a liquid photoformable material, of preferably 0.030" thickness or less, which are flat to within preferably 0.001" per square inch or better, and by which previously exposed layers are minimally distorted or damaged during the coating process for the production of three-dimensional objects by sequential coating of said layers and exposure after each coating.

SUMMARY OF THE INVENTION

This invention provides unique solutions to these problems by utilizing a semi-permeable film, which is impermeable to the photoformable composition but is permeable to a deformable-coating-mixture that is non-wetting and immiscible with the photoformable composition. The deformable-coating-mixture passes through the membrane preferably by diffusion effects and forms a thin, slippery surface on the photoformable composition side of the membrane, thereby eliminating any adhesion forces caused by chemical, mechanical or hydrogen bonds and the like. Also this invention teaches of methods by which dissolved inhibitors can be used within the deformable-coating-mixtures and within the composition to provide improved interlayer adhesion and gentler coating. Furthermore, this invention teaches methods by which recesses or large orifices can be created, between the film and previously formed layers, through which the photoformable composition may be caused to flow, thereby substantially alleviating vacuum forces that may arise during separation of the film from the photoformed layer.

A method for fabricating an integral three-dimensional object from successive layers of a photoformable composition comprising the steps of:
a) positioning a substantially transparent, composition-impermeable, composition-inert, semi-permeable film, having a first surface and a second surface, such that said film first surface is, at least partially, in contact with an imaging atmosphere, and said film second surface is, at least partially, in contact with the photoformable composition;
b) contacting an interface of said composition with a composition atmosphere;
c) allowing said imaging atmosphere to permeate through said film and partially into a photoformable-composition-layer;
d) exposing said photoformable-composition-layer to radiation imagewise through said film making a photoformed layer and a deformable-composition-release-coating;
e) sliding said film from said photoformed layer;
f) positioning said film in such a way as to form a photoformable-composition-layer between said previously made photoformed layer and said film second surface; and
g) repeating steps c–f until said layers of the integral three-dimensional object are formed.

Single layers may be fabricated as above by performing the steps a–e above.

BRIEF DESCRIPTION OF THE DRAWINGS

The reader's understanding of practical implementation of preferred embodiments of the invention will be enhanced by reference to the following detailed description taken in conjunction with perusal of the drawing figures, wherein.

DESCRIPTION OF THE PREFERRED EMBODIMENTS

This invention relates to a process and apparatus for producing three-dimensional objects by photoforming, and more particularly to the use of semi-permeable films and coatings useful for providing a release mechanism from photoformed layers during the formation process.

The readers appreciation and understanding of the inventions described herein will be enhanced by reference to the drawings and a description of the drawings and operation described below.

Figure 1:
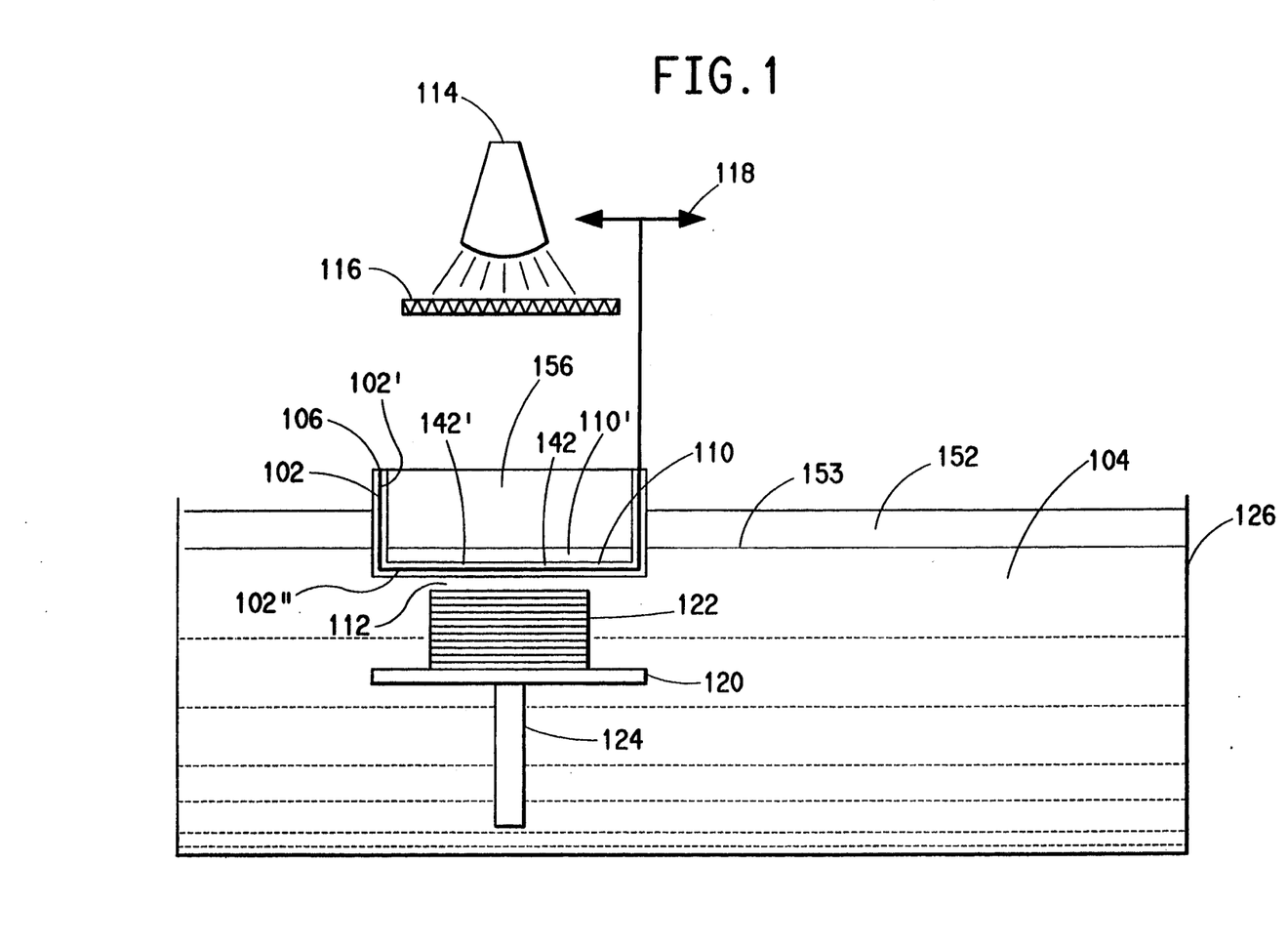
FIG. 1 depicts the major elements in an embodiment of the invention during the imaging step.

In reference now to FIG. 1, there is provided a semi-permeable film 102, having first and second surfaces, positioned in a photoformable composition 104 by tenter frame 106 in such a manner that the film second surface 102" is in contact with the photoformable composition 104 and the film first surface 102' is facing away from the composition 104. The film 102 is held to a particular shape by placing it in a tenter frame 106. A deformable-coating-mixture 110' with a dissolved inhibitor 142' is introduced on the film first surface 102' side. Also, a permeated-deformable-release-coating 110 with a permeated inhibitor 142 is between the film second surface 102" and a photoformable-composition-layer 112. This photoformable-composition-layer 112 may contain different concentrations than that of photoformable composition 104 due to, for example, dissolved inhibitor 142' diffusing through the semi-permeable film 102. For the purposes of this invention, a deformable release coating shall mean a coating, of one molecular thickness or more, that is a gas, a liquid, and/or a gel such that its shape may be changed by the application of pressures or forces. Similarly, a photoformable composition is a material which is a liquid and/or a gel, which may contain dissolved gases, and which, photoforms, hardens or increases in viscosity when exposed to appropriate sources of radiation. A radiation source 114 illuminates specific regions of photoformable-composition-layer 112 through a photomask 116 causing the photoformable-composition-layer 112 to harden. After photoformable-composition-layer 112 is photoformed, creating photoformed layer(s) 122, radiation source 114 is turned off or shuttered and tenter frame 106 and film 102 are slid from the surface of photoformed layer 122 by frame assembly translation means 118 (shown in FIG. 1 as an arrow for the sake of simplicity). Then the platform 120 and the previously photoformed layer(s) 122 are translated at least one photoformable-composition-layer thickness relative from the original surface of film 102 and permeated-deformable-release-coating 110 by platform translation means 124. After the previously photoformed layer(s) 122 have been translated by platform translation means 124, frame assembly translation means 118 moves the film 102 and tenter frame 106 back into substantially its original position, moving aside photoformable composition 104 and forming a new photoformable-composition-layer 112. This process is continued until the desired three-dimensional object is imaged. In the embodiment shown in FIG. 1, the photoformable composition 104 is contained in a vat 126. The photoformable composition 104 forms a composition/atmosphere interface 153. Above this composition/atmosphere interface 153, there is a composition atmosphere 152. Above the film 102 held to a shape by the tenter frame 106 and the deformable-coating-mixture 110', there is an imaging atmosphere 156 which may be different from the composition atmosphere 152.

Figure 2:
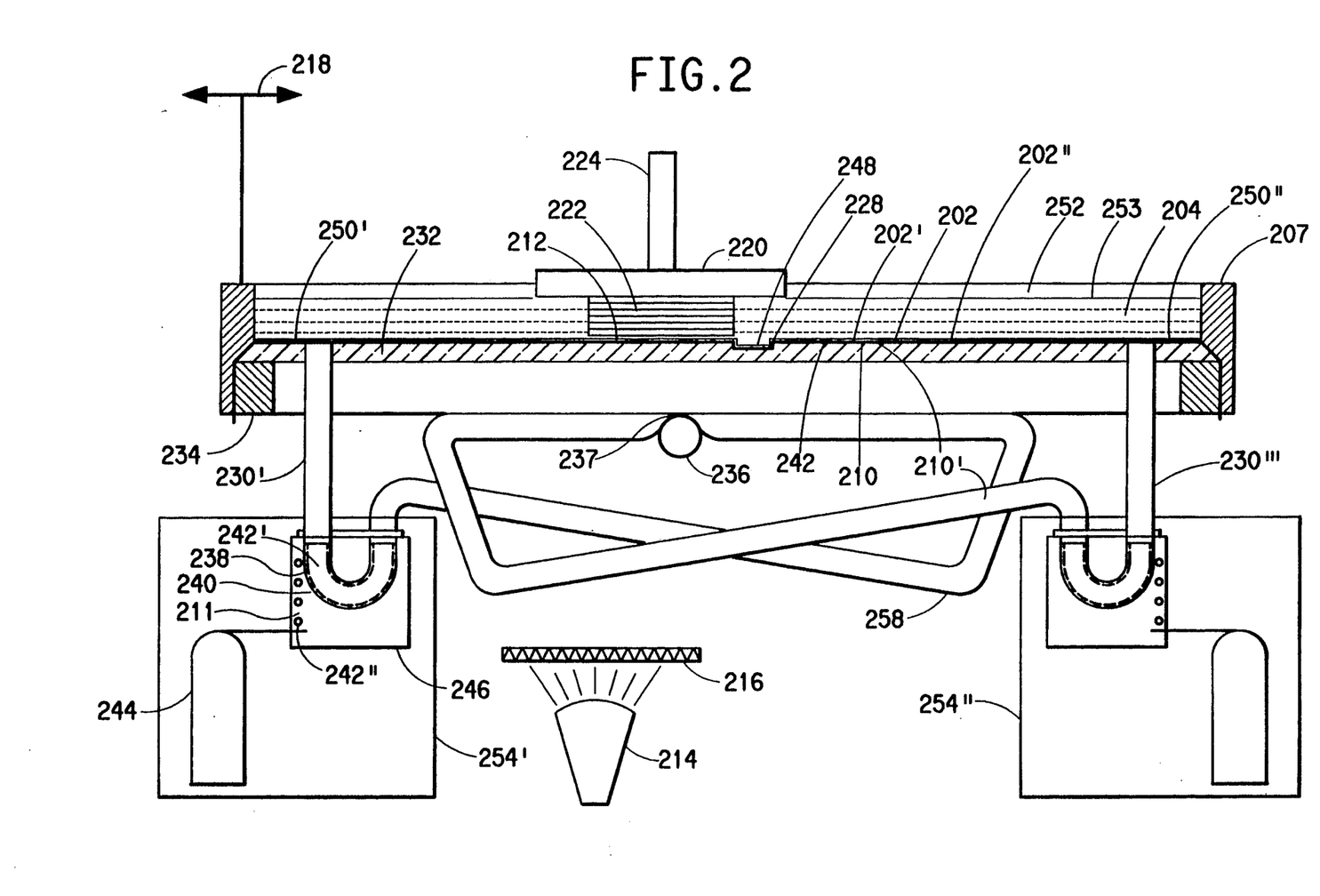
FIG. 2 depicts a preferred embodiment of the invention during the process of sliding the imaged layers in preparation for another photoformable-composition-layer.

FIG. 2 depicts a preferred embodiment of the instant invention. In this embodiment there is a semi-permeable transparent film 202, having first and second surfaces, with the film second surface 202" facing the photoformable composition 204 and the film first surface 202' facing a transparent plate 232. The transparent plate 232, having first and second faces 232' and 232" respectively, has the first plate face 232' facing the composition 204 and the second plate face 232" facing away from the composition 204. The film 202 is stretched to conform to the shape of the plate 232 and both film 202 and plate 232 are secured in a frame 207, which also serves as a composition 204 vat, by compression flange 234 using securing means (screws, levers, etc. not shown for clarity) such that the film 202 and plate 232 are sealed and the photoformable composition 204 does not leak from the frame 207 between the film 202 and the frame 207, and pressures can be maintained without leakage between the film 202 and the plate 232. A deformable-coating-mixture 210' is introduced between the film 202 and the plate 232 through first tube 230' and second tube 230" which are sealed to the plate 232 in a manner adequate to prevent leakage. First and second tubes 230' and 230" are connected respectively to a first replenishment assembly 254' and a second replenishment assembly 254", each of which comprise respectively a porous tube 238, a tube screen 240, a concentrated inhibitor 242", dissolved inhibitor 242', transfer solution 211, a flask 246, and an inhibitor supply 244. The porous tubes 238 in first and second replenishment assemblies 254' and 254" are connected to each other through flexible tube 258. The flexible tube 258 is squeezed by squeeze roller 236 against a portion of frame 207 in such a manner that the flexible tube 258 is divided preventing the deformable-coating-mixture 210' and any dissolved inhibitor 242' from flowing through the squeeze point 237. The deformable-coating-mixture 210' along with dissolved inhibitor 242' permeates through the film 202 forming a permeated-deformable-release-coating 210 with permeated inhibitor 242 on the film second surface 202" between the film 202 and the composition 204. In plate 232 there is a recess region 228. Wedge 248 is secured in this recess region 228 in such a manner as to divide the film 202 secured between the plate 232 and frame 207 into two chambers, first chamber 250' and second chamber 250". Above the frame 207 there is a composition atmosphere 252. The frame assembly (comprising frame 207, plate 232, first and second chambers 250' and 250", composition 204, compression flange 234, first and second tubes 230' and 230", recess 228, wedge 248 and portions of flexible tube 258) are moved relative to the squeeze roller 236 the radiation source 214, the photomask 216, the photoformed layers 222, the platform 220, and the platform translation means 224, in a direction substantially parallel to the first plate face 232' by frame assembly translation means 218. Platform translation means 224 translates the platform 220 and any photoformed layers 222 in a direction substantially normal to the first plate face 232'. When the platform 220 or previously photoformed layers 222 creates a region of photoformable composition 204 one layer thickness between the platform 220 or the photoformed layer(s) 222 and the permeated-deformable-release-coating 210, in preparation for exposure by radiation source 214 through photomask 216, a photoformable-composition-layer 212 exists. This photoformable-composition-layer 212 may contain different concentrations than that of photoformable composition 204 due to, for example, dissolved gases or inhibitors 242 diffusing through the coating 210 into photoformable-composition-layer 212.

The operation of the apparatus in FIG. 2 is as follows:

Photoformable composition 204 is placed in the frame 207. It is not necessary that frame 207 be leveled, relative to earth's gravity, except to prevent the composition 204 from flowing over the frame 207 sides. It is only necessary to provide enough composition 204 in frame 207 to ensure that a complete object can be made and that composition atmosphere 252 bubbles are not introduced between the platform 220 and the plate 232 during translation by translation means 218 or 224. If necessary, photoformable composition 204 refill means (not shown) may be provided. Chambers 250' and 250" are filled with deformable-coating-mixture 210' and dissolved inhibitor 242' in a manner such that when one chamber, for example first chamber 250', has the deformable-coating-mixture 210' and dissolved inhibitor 242' being drawn from it, second chamber 250" has the deformable-coating-mixture 210' and dissolved inhibitor 242' entering it. This is due to the pumping action of squeeze roller 236 rolling and squeezing flexible tube 258 against frame 207 as frame assembly translation means 218 translates the frame assembly (comprising items described above), thereby changing the volume of flexible tubing 258 connected as described above to first and second chambers 250' and 250". As shown, therefore, as the frame assembly (comprising items described above) is translated by frame assembly translation means 218 to the right, squeeze roller 236 squeezes and reduces the volume of flexible tube 258 connected through second replenishment assembly 254" and second tube 230" to second chamber 250". The deformable-coating-mixture 210' and dissolved inhibitor 242' thereby flows into second chamber 250" causing it to bulge. In the preferred embodiment, film 202 is elastomeric and therefore is capable of bulging or flattening without permanent deformation. On the other side, while the frame assembly (comprising items described above) moves to the right, the volume, in flexible tubing 258 connected through first replenishment assembly 254' and first tube 230' to first chamber 250', increases, thereby drawing deformable-coating-mixture 210' and dissolved inhibitor 242' from the first chamber 250' and causing the film 202 to flatten on this side. As the frame assembly (comprising items described above) is moved to the left the volume changes, the deformable-coating-mixture 210' flow, and the bulging/flattening relationships between first and second chambers 250' and 250" would be reversed. As the frame assembly (comprising items described above) moves and pumps the deformable-coating-mixture 210' and dissolved inhibitor 242' into or out of the first and second chambers 250' and 250" the deformable-coating-mixture 210' and dissolved inhibitor 242' pass through the, first and second replenishment assemblies 254' and 254" respectively. Within said first and second replenishment assemblies 254' and 254", a porous tubing 238 contains the flow of coating mixture 210' and 242' while allowing concentrated inhibitor 242" to pass by diffusion means into the deformable-coating-mixture 210'. The porous tubing 238, further described later, is such that it can substantially contain a relative pressure but may collapse when containing a relative vacuum. The tube screen 240 prevents the collapse of porous tubing 238 when a relative vacuum is being maintained. Since during the photoformation process further described, permeated inhibitor 242 is consumed, there will be diffusion of dissolved inhibitor 242' through the film 202 from the deformable-coating-mixture 210' thereby decreasing its concentration of dissolved inhibitor 242'. In the replenishment assemblies 254' and 254" inhibitor supply 244 maintains the concentration of concentrated inhibitor 242" at a relatively high level in the transfer solution 211 within the flask 246. Therefore, diffusion and the flow of deformable-coating-mixture 210' and dissolved inhibitor 242' (due to volume changes in flexible tubing 258 as described above) through porous tube 238 causes the concentrated inhibitor 242" to replenish the low concentration of dissolved inhibitor 242', which in turn permeates through film 202, replenishing the concentration of permeated inhibitor 242, and which in turn diffuses into the photoformable-composition-layer 212.

In preparation for making photoformed layer(s) 222, for example, the frame assembly (comprising items described above) is moved to the right by frame assembly translation means 218 such that platform 220 is facing a flat region of the plate first face 232'. The platform 220 is translated by platform translation means 224 to a position such that a photoformable-composition-layer 212 is formed. Radiation source 214 and photomask 216 are positioned such that they can shine substantially collimated illumination, through the plate 232 (The reader should understand that the only thing substantially limiting illumination of the plate 232 by radiation source 214 is photomask 216.), deformable-coating-mixture 210' and dissolved inhibitor 242', film 202, and permeated-deformable-release-coating 210 and permeated inhibitor 242, into photoformable-composition-layer 212. An imagewise exposure is made that is substantial enough to create a photoformed layer 222 portions of which substantially adhere to platform 220. Preferably platform translation means 224 translates the platform 220 and any attached photoformed layer 222 the distance of one photoformable-composition-layer away form plate 232. This usually causes the film 202, the permeated-deformable-release-coating 210, the permeated inhibitor 242, the deformable-coating-mixture 210', and dissolved inhibitor 242' to substantially rise also, overcoming the relative vacuum formed in flexible tubing 258. Next or simultaneously, frame assembly translation means 218 translates the frame assembly (comprising items described above) to the left. As this occurs, portions of photoformed layer 222 reach the edge of recess 228 where the film 202 and permeated-deformable-release-coating 210 substantially separate from the photoformed layer 222. Photoformable composition 204 flows with substantial ease through recess 228 to fill the gap at the separation line between the photoformed layer 222 and film 202. When the photoformed layer 222 passes over the right edge of recess 228 a new photoformable-composition-layer 212 is created above the second chamber 250''. As this occurs, second chamber 250'' collapses (for reasons described above) causing film 202 and the coating mixtures to conform to the substantially flat shape of plate 232 in this region. From this point, another imagewise exposure can be made substantial enough to adhere portions of the newly photoformed layer 222 to the previous photoformed layer(s) 222. The process above can be repeated, coating photoformable composition 204 on one side and exposing imagewise on the same side then separating the photoformed layers 222 from the film 202, etc. until all photoformed layers 222 have been fabricated necessary for the production of an object.

It is preferred that the film be impermeable to the photoformable composition and substantially inert to it. The impermeability prevents the composition from passing from the composition contacted surface of the film to the other surface, or into the pores of the film, where the radiation would photoform it. Examples of such films may be composed of polypropylene (such as, for example, film manufactured by Hercules Inc. Wilmington DE), Teflon PFA ®, Teflon TFE ® (such as, for example, manufactured by E. I. DuPont De Nemours Inc., Wilmington DE), or polyethylene, etc. or any of a number of polymer and copolymer films. Some films such as, for example, molecularporous membranes (such as, for example, those manufactured by Spectrum Medical Industries, Los Angeles, CA), may prove suitable for some applications of the invention in that they have a known pore size that allows molecules of low molecular weight to pass through the film while molecules of a size larger than the pore size cutoff are prevented from passing through the film. For such an application, it would be desirable for the molecular size of the composition to be larger than the pore size and for the molecular weight of a deformable-coating-mixture (such as will be described later) and diffused inhibitors to be of smaller molecular size than the pore size. In this case, a deformable-coating-mixture can pass through the film by, for example capillary action. In the case of FIG. 2, the preferred porous tubing 238 is, for example, Spectra/Por molecularporous membrane tubings which have molecular weight cutoffs in the range of 100 to 500. These porous tubes 238 can withstand fairly high pressures and are capable of diffusing concentrated inhibitors 242'', for example concentrated oxygen, without substantially diffusing the transfer solution 211 or deformable-coating-mixture 210'. Still more preferable is a film that is of substantially different molecular polarity than that of the photoformable composition or that of the photoformed layers such that the composition and the photoformed layers tend not to wet the film. This is advantageous for several reasons: Lack of wetting of the film by the composition decreases the potential for bonding to the film during photoforming of the composition. And, since all films are porous to some degree or molecular size, lack of wetting by the composition significantly decreases its permeation of the film since surface tension effects tend to prevent the composition from entering or passing through the pores. (Such art is the basis of many products, for example, Goretex ® manufactured by Gore Associates Inc., Newark, DE.).

Preferably, the film is held submerged in the photoformable composition and held substantially to a particular shape, preferably substantially flat, by placement of a transparent plate against the film surface that is opposite the photoformable composition. In the preferred mode, shown in FIG. 2, in which UV light is the preferred radiation source 214, the plate 232 usually is made of, for example, quartz, fused silica, waterwhite glass, or any other material that is substantially transparent to the wavelength in use and has substantially good optical qualities. For other forms of radiation such as, for example, microwave or dielectric excitation, plastics or even metals may provide suitable plate material if they are substantially transparent to the radiation and if they induce substantially low distortion of the electromagnetic fields. Or, as in the case of FIG. 1, the film 102 may be held to a particular shape by use of a tenter frame 106, or the film 102 may even possess the desired shape and necessary stiffness to obviate the need for a frame 106. For the purposes of this invention, referring now to FIG. 2, a substantially flat plate 232 in contact with the film 202 is preferred, however, the plate 232 may have any curvature that allows sliding of the film 202 from the photoformed surface 222 and does not create damaging vacuum forces between the film 202 and the photoformed layer 222 during the sliding action. The film 202 is preferably pulled by vacuum means (combination of 218, 236 and 258 as described above) to ensure it conforms substantially to the shape of the plate 232 it contacts. The plate 232 may be of any useful size necessary for the production of large or small photoformed layers. The plate may also be, for example, an optical fiber.

For the purposes of the instant invention, it is preferred that the film be an elastomeric film since such films conform more readily to the shape of any desired surface and these films, such as, for example, silicone, tend to have high diffusion coefficients even though the molecular size of the penetrant molecule is greater than the pore or hole size. A penetrant molecule can often temporarily expand holes in films if the films have polymer chain mobility. Thus the penetrant can move the polymer chains aside and squeeze through the expanded holes or pores. Elastomeric films typically have even greater chain mobility enhancing the ability of the penetrant to expand the holes and therefore increasing the diffusion of the penetrant. Further enhancing this penetration is the presence of a plasticizer, such as for example a deformable-coating-mixture, which increases the film chain mobility and creates swelling, thus allowing easier permeation of the penetrant through the film.

Preferred elastomeric films are, for example, transparent silicone elastomers and fluoroelastomers, such as for example clear Kalrez ®, sold by DuPont. Most preferable are fluoroelastomers. A film of this type, which was extensively used during this work, was prepared as follows:

(A) a 10 gallon stainless steel autoclave was evacuated and purged with nitrogen and then was charged with 2600 liters of deionized, de-oxygenated water containing 1.5 liters of Freon 113 (1,1,2 trichloro, 1,2,2 trifluoro ethane), and in which was dissolved 56 g. of ammonium perfluorooctanoate surfactant (FC-143, 3M Co.). The reactor was then pressured to about 0.2 MPa (30 psi) with the "start-up monomer" mixture which had the following composition: 30% by weight TFE (tetrafluoroethylene) and 70% by weight PMVE (perfluoro (methyl vinyl ether)). The autoclave was vented off to about 0.03 MPa (5 psi). The pressuring and venting was repeated 2 more times. At this time, 3.6 g of 1,4 diodoperfluorobutane, dissolved in 36 ml of 1,1,2 trichloro 1,2,2 trifluoroethane, was added, and the autoclave was heated to 80° C. while stirring at 125 rpm. The autoclave was then pressured to 2.1 MPa (300 psi) with the "start-up monomer" mixture described above. To start the polymerization, the autoclave was charged with 20 ml of a 2% solution of ammonium persulfate in water. After the pressure in the autoclave had decreased to about 2.0 MPa (295 psi). The autoclave was maintained at a pressure of about 2.1 MPa (300 psi), during the course of the polymerization, by regular addition of the "make-up monomer" mixture. The "make-up monomer" mixture had the following composition: 46% by weight TFE, 8% by weight ethylene, and 46% by weight PMVE. The polymerization was allowed to continue for a total of 15 hours during which time 6500 grams of the make-up monomer mixture was added. Also, during this period an additional 129 ml of 1% ammonium persulfate was added in small increments. The unreacted monomers were vented from the autoclave and the polymer dispersion was discharged into a large container. The pH of the dispersion was 2.7 and it contained 20.7% solids.

The fluoroelastomer was isolated from 500 ml of the above dispersion by coagulating with potassium aluminum sulfate solution. The coagulated polymer was separated from the supernate by filtration and then washed 3 times by high speed stirring in a large blender. Finally, the wet crumb was dried in a vacuum oven at 70° C. for 40 hours. The recovered, dry polymer from the 500 ml aliquot weighed 114 grams. The composition of the fluoroelastomer was as follows: 45% by weight TFE, 6.8% by weight ethylene, and 38.2% by weight PMVE. The polymer contained 0.22% iodine and had a Mooney viscosity, ML-10, measured at 121 C. of 32.

(B) A 10 gallon autoclave was charged with 30 Kg of the polymer dispersion prepared in (A) above. The autoclave was then evacuated and purged 3 times with nitrogen, then 3 times with a new "start-up" monomer mixture of the following composition: 90% by weight TFE and 10% by weight ethylene. The autoclave was then heated to 80° C. and pressured to 1.3 MPa (190 psi) with the new "start-up monomer" mixture. The polymerization was then initiated by addition of 20 ml of 1% ammonium persulfate solution. The pressure was kept constant by addition of a new "make-up monomer" mixture which had a composition of 80% by weight TFE and 20% by weight ethylene. A total of 1050 g of the new "make-up monomer" mixture was added in a 4.3 hour reaction time. The monomers were then vented off and the segmented polymer dispersion was discharged from the reactor. The dispersion contained 26.8% solids. The segmented polymer was isolated from the dispersion in the same manner as described for the fluorelastomer in (A) above. A total of 8.3 Kg of polymer was recovered.

Differential Scanning Calorimetry testing on the segmented polymer indicated a glass transition temperature of $-14°$ C. for the fluoroelastomer segment and a melting point of 233° C. for the thermoplastic segments. The iodine content of the polymer was 0.13%. The melt index (ASTM D-2116 using a 5 kg weight at 275° C.) was 3.0 g/10 min.

A compression molded film of the polymer had M100 (modulus at 100% elongation) of 3.4 MPa (500 psi), tensile strength (break) of 23.4 MPa (3400 psi) and elongation (break) of 380%.

The fluffy polymer recovered according to the above procedure was extruded into beads (approx. 3 mm×6 mm) in a 28 mm twin screw extruder at 250° C. under nitrogen. The same type of extruder was then used at 300° C. under nitrogen to extrude a film through a slit die on a casting drum. The film thickness was 0.0115".

The Applicants suggest that an understanding of the following proposed concepts will give the reader an appreciation of the novelty and advantages of their invention. However, these proposed concepts should only be taken as suggestions to the reader, and by no means, should the Applicants' proposals be construed as limiting in any way the breadth and scope of this invention.

A material which is in contact with a photoformable composition during exposure might interfere with the cross-linking. If the material, for example, a Teflon ® film or a nitrogen atmosphere, is substantially inert to the photoforming process and is the only material in contact with the composition at the time of the exposure, it is likely that the composition will cross-link to a significant degree. The degree of cross-linking is limited by, for example, the presence of an inhibitor in the composition, the lack of adequate radiation, an improperly mixed formulation, etc. However, assuming all these conditions are not present, the degree of cross-linking is often limited by, for example, the change in mobility of radicals within a increasingly more viscous matrix. This is to say that even under the most ideal conditions, the degree of cross-linking of, for example, a photoformed layer is often by nature incomplete. This incompleteness of cross-linking or presence of active sites, if it exists on the surface of a photoformed layer, may provide potential cross-linking sites to which a subsequent photoformable-composition-layer may bond (by cross-linking). However, a greater degree of cross-linking or a lesser number of active sites on the surface of a first photoformed layer, provides fewer cross-linking sites for the bonding of subsequent photoformed layers to the first layer by cross-linking means. Therefore it is reasonable to assume that a film, for example Teflon ®, or an imaging atmosphere, for example nitrogen, which is substantially inert to the cross-linking, but by its presence in contact with the photoformable composition during exposure, tends to prevent inhibitors from contacting the composition during the exposure, will allow a greater degree of cross-linking, and therefore fewer active cross-linking sites to which subsequent photoformed layers might adhere. In short, an inert material, whether a gas, a liquid, a gel, or a solid, in contact with a photoformable composition during exposure, may significantly interfere with the photoformed layer's ability to cross-link to subsequent photoformed layers.

If, on the other hand, a substantially inert film, for example the above fluoroelastomer, or a permeated-deformable-release-coating, such as for example FC-40 (described later), or an imaging atmosphere, which allows the presence of an inhibitor to be in contact with the photoformable-composition-layer during exposure, is utilized, there will be a lesser degree of cross-linking at the interface and there may be more active sites present to which subsequent layers may bond. It should be understood that the imaging atmospheres described may contain an inhibitor, such as for example oxygen. An inhibitor, whether from the atmosphere, inherent in the coatings, or inherent in the formulation of the photoformable composition, is free to diffuse into the composition and change the composition concentration. The presence of inhibitors typically decrease the degree of cross-linking by, for example, quenching an initiator or quenching a radicalized monomer. In many cases, the quenched initiators or quenched radicalized monomers are at least partially no longer available to participate in a photo reaction. Therefore, quenched monomers immediately at an interface, where the inhibitor concentration is the highest, for example, at the interface of the permeated-deformable-release-coating within the photoformable-composition-layer, are likely not to be cross-linked nor are they usually considered to be active sites for subsequent bonding of new photoformed layers. This inhibited interface has been substantially reduced in ability to subsequently cross-link. (This interface also is still nicely deformable, aiding in the release from a film and aiding in subsequent coating.) However, if we consider a region just slightly further away from the interface within the composition, where the concentration of inhibitor is lower (due to lower concentration of inhibitor in the photoformable composition as a whole, and due to oxygen consumption at the interface of the photoforming composition layer during radical-/initiator quenching and subsequent diffusion effects of oxygen toward the interface from the remainder of the photoforming composition layer), the degree of cross-linking is increased due to a reduction in inhibitor quenching of initiator and radicalized monomer. But there is also a greater degree of future active sites because the interface of the photoforming composition layer absorbed some of the radiation and allowed less production of radicalized initiator and radicalized monomer to be formed during the exposure in the remainder of the photoforming composition layer. As we consider regions further and further away from the interface, in the photoforming composition layer, the same trends continue; greater degree of cross-linking due to fewer quenched radicals, and fewer radicals formed providing more future active sites. Also, as we consider regions further and further away from the interface, in the photoforming composition layer, the amount of quenched monomer and therefore the amount of deformable composition (though no longer considered to be photoformable composition in many cases) becomes less and less causing a relatively gradual transition from deformable composition to photoformed layer. This gradual transition is very useful since it precludes chemical bonding and mechanical bonding at the interface of the photoforming composition layer and aids in reduction of vacuum forces that may arise during the removal of the film from the photoformed layer. And this gradual transition is also useful since there is now a substantially greater surface area of potential cross-linking sites and mechanical bond sites connected to the photoformed layer to which subsequently applied and exposed photoformed layers may bond, thereby increasing the layer to layer adhesion in the formed object.

It is an important distinction in this invention that the films and coatings, which are substantially inert relative to, and which are immiscible in, the composition, whether photoformable or photoformed, nevertheless allow the supply of permeated inhibitors through them into the composition, and therefore can aid in both release of the photoformed layer from the films and subsequent bonding of new photoformed layers in regions substantially away from the film/coating/composition immediate interface.

The importance of the composition atmosphere in contact with the photoformable composition becomes more apparent when a semi-permeable film that employs, for example, oxygen diffusion is utilized. For example, if the composition atmosphere is pure nitrogen, it is reasonable to assume that the photoformable composition contained in the vat on average contains less oxygen than normal, assuming equilibrium conditions. It is also reasonable that the photoformable-composition-layer will have a sharper increase in the amount of dissolved oxygen as the semi-permeable film which diffuses oxygen is approached. And it might be expected that the photoformed layer would also display a sharper decrease in degree of cross-linking as the film is approached. Therefore control of the components of the composition atmosphere, control of inhibitors in the coatings, and/or control of the imaging atmosphere, which all affect the concentration of inhibitor within the photoformable-composition-layer, are important elements that affect the degree of bonding of one photoformed layer to another and the ability of a photoformed layer to be separated from another material through which it was exposed while in contact.

While it is preferred that the composition atmosphere be, for example, nitrogen, this in most cases is harder to control. It is possible to contain the entire apparatus in an enclosure and to control the composition atmosphere to any desired extent. Such a apparatus could, for example, blow air and, for example blow extra nitrogen or oxygen into the enclosure using a conventional blower and regulated tanks of gas. This might be useful, since with most photoformable compositions when exposed using conventional methods (i.e. exposing the photoformable composition without the use of a film or transparent plate) the extra nitrogen in the composition atmosphere will increase the photospeed of the composition, or the extra oxygen in the atmosphere would improve interlayer adhesion. In addition the composition atmosphere could be changed during exposure (e.g. the composition atmosphere might comprise roughly 95% nitrogen, 5% oxygen before exposure, and the imaging atmosphere could be changed to comprise roughly 75% nitrogen, 25% oxygen during exposure) to obtain a sharper transition from photoformed layer to deformable composition (as described above), and therefore have higher photospeed yet good photoformed layer adhesion. It is more preferred, however, that the composition atmosphere be air and that the concentration of permeated inhibitor in the permeated-deformable-release-coating be higher than that normally found in air.

Studies were conducted, by the Applicants, with several films, Mylar ® polyester, fluoroelastomer (described above), polyethylene, Teflon PFA ®, and Kalrez ® to determine if there was an inherently inhibiting effect on photoformable compositions exposed in contact with and through the films. The tests were conducted with the film in contact with the photopolymer on one side and air or nitrogen, as the imaging atmosphere, on the other side. Exposures were made with a mercury arc lamp from the film/atmosphere side into the photopolymer. In most cases where air was the gas on one side of the film, the hardened layer of photopolymer was substantially softer at the interface between the film and the photopolymer layer produced. In cases where nitrogen was the gas on one side of the film, the interface between the film and exposed photopolymer was more hardened. This indicates that the film materials themselves may not inhibit the cross-linking ability of the photopolymers exposed in contact with the film, but that it is the presence of air or, more probably oxygen, which permeates through the film and inhibits the cross-linking ability of the photopolymer at the film interface during exposure.

Additional studies were performed, by the Applicants, that appear to support the conclusion that it is permeation of air through the film during exposure that inhibits the cross-linking ability of the photopolymer, rather than the molecular structure or inherent inhibiting effect of the film. Samples were prepared using a photopolymer which consisted of a formulation as detailed in DuPont's U.S. Pat. No. 5,002,854 entitled "Solid Imaging Method Using Compositions Containing Core-Shell Polymers", Example 2, hereinafter referred to as TE-541. The samples were exposed using an Ultracure 100 mercury arc lamp source manufactured by Efos Inc. of Mississauga, Ontario, Canada. The output of the light was filtered through a Corning 7-51 filter which allows transmission of light from the lamp in a range of UV centered around 365 nm. Exposures were given for around 10 seconds over an area of about 2.5 in. diameter. Each sample was exposed with one surface of the following materials, wetting the photopolymer and the other surface of the materials exposed to an imaging atmosphere. The materials tested were 1.0 mil polyethylene film, 1.5 mil Teflon PFA ® film, 11.5 mil fluoroelastomer film (as described above), 32 mil Kalrez ® film, Teflon AF ® coated quartz, Fluorinert TM FC-40 (perfluorocarbon) liquid, or water. Each sample was exposed with an air imaging atmosphere or a nitrogen imaging atmosphere on one side of the above materials. After exposure, the layers of photopolymer were removed from the above materials, keeping track of the layer surface in contact with the film, and cut in a strip of size appropriate for performing an IR reflectance analysis using a BIO-RAD, Digilab Division, FTS-60 Fourier Transform Infrared Spectroscopy in reflectance scan mode. The photoformed layer samples were placed with the film interface side contacting a KRS-5 (Thallium Bromo-Iodide) crystal in a ATR-IR (Attenuated Total Reflectance) accessory used for measuring the spectroscopic reflectance. In reflectance mode, this instrument is capable of outputting the spectra of the surface of a sample, from which the degree of conversion (polymerization or cross-linking) of the sample surface can be determined. The degree of conversion can be determined by comparing the ratio of a specific wavenumber peak height above baseline, which peak height is known to change with degree of conversion, to another wavenumber peak height above baseline, which is known to be substantially unchanged by the degree of conversion. In the case of TE-1541 photopolymer, the peak height (above baseline value) of, for example, 811 wavenumber decreases with greater polymerization and the peak height (above baseline value) of, for example, 1736 wavenumber is substantially unchanged by the amount of polymer conversion or polymerization. Therefore, in evaluating the ratio of the peak height of 811 wavenumber to the peak height of 1736 wavenumber, a decrease in value of this ratio indicates that a greater degree of conversion occurred. As an item of comparison, the unexposed monomer (TE-1541) was also tested using the above evaluation method.

Following are the rankings in the test with the ranking from the most conversion to the least conversion:

| Exposure Contact Surface | 811/1736 Wn Ratio |
|---|---|
| Polyethylene Film-Nitrogen | .143 |
| Teflon PFA ® Film-Nitrogen | .185 |
| Fluoroelastomer Film-Nitrogen | .197 |
| Teflon AF ® on Quartz-Nitrogen | .211 |
| Water-Air | .212 |
| Water-Air | .245 |
| Teflon PFA ® Film-Air | .252 |
| Mylar ® Film-Nitrogen | .259 |
| Water-Nitrogen | .259 |
| Kalrez ® Film-Nitrogen | .337 |
| Fluorinert TM -Air | .359 |
| Teflon AF ® on Quartz-Air | .362 |
| Polyethylene Film-Air | .376 |
| Fluorinert TM -Nitrogen | .379 |
| Kalrez ® Film-Air | .420 |
| Mylar ® Film-Air | .473 |
| Fluoroelastomer Film-Air | .477 |
| Unexposed Monomer (TE-1541) | .518 |

As can be seen from the above ranking, the surface of a layer exposed through a film that has nitrogen as the imaging atmosphere nearly always shows a greater degree of conversion than does the same film if air is the imaging atmosphere. Water, with air or nitrogen as the imaging atmosphere, shows little difference in degree of conversion since relatively little oxygen is soluble in water in the natural state. And in fact, the evaluations made with water tend to indicate the amount of error present in the test. The samples testes with Fluorinert TM liquid also show very little difference whether the imaging atmosphere is air or nitrogen. It is believed that this is due to the fact that Fluorinert TM has a special affinity for oxygen and the oxygen must be removed using stronger measures than just placing the liquid in a nitrogen imaging atmosphere for an hour or so. However, independent of error, a general ranking may be obtained from the evaluation giving a good indication that the imaging atmosphere on one side of a film permeates through the film and affects the degree of conversion of the photopolymer during exposure. It is also important to note that the fluoroelastomer film, which is the most preferred film for the purposes of this invention, having an imaging atmosphere of air, creates an exposed photoformed layer surface adjacent to the film with the lowest degree of conversion and exhibits the greatest difference in degree of conversion when an exposure is made in a nitrogen imaging atmosphere. This suggests that the fluoroelastomer film has the greatest permeability to oxygen of all films tested, yet with substantially no inherent inhibition or effect on cross-linking of the contacting photopolymer being exposed. That is, the film material is substantially inert to the photoformation of the composition, however, its ability to be permeated by, for example, oxygen, or its readiness to allow oxygen to diffuse through it, provides a substantially inhibited surface of deformable composition at the interface between the film and exposed photoformed layer, which in turn allows easier removal of the film by, for example, sliding means, or for example, peeling means. Essentially, the inhibited composition at the fluoroelastomer film surface, when inhibited by permeated oxygen, becomes a deformable-composition-release-coating.

In the case of FIG. 2, it is preferred that, a transparent deformable-coating-mixture 210', preferably a liquid but possibly a gel, be introduced between the plate 232 and the film 202 to ensure good optical coupling between the two. Even more preferable is a deformable-coating-mixture 210' that permeates the film 202 and/or is a plasticizer of the film 202. And still more preferable is a deformable-coating-mixture 210' that is of substantially similar molecular polarity to that of the film 202 while being of substantially dissimilar molecular polarity to that of the photoformable composition 204, photoformable-composition-layer 212, and photoformed layers 222. Also, it is more preferable that such a deformable-coating-mixture 210' be of substantially low viscosity and have substantially good lubricity. It is more preferred that such a deformable-coating-mixture 210' be the same material as the permeated-deformable-release-coating 210. And still more preferable that such a deformable-coating-mixture 210' tend to be transferred from the film first surface 202' to the film second surface 202" by diffusion, whereby diffusion effects replenish the permeated-deformable-release-coating 210 on the film second surface 202" should the concentration of the permeated-deformable-release-coating 210 become diminished, and whereby diffusion effects no longer cause transfer of deformable-coating-mixture 210' once the concentration of coating is substantially the same on both the film first surface 202' and the film second surface 202". It is in the preferred case that diffusion provides the driving force or pressure for the deformable-coating-mixture 210' to pass through the film 202. Another preferable route would be for osmotic pressure to provide this driving force. Even more preferable, is a film 202 which is permeable to, for example, air or oxygen (or other inhibitor, whether as a gas or more preferably dissolved in solution with the coating), whereby an inhibition of photoforming of the photoformable-composition-layer 212 occurs at the interface between the permeated-deformable-release-coating 210 and the photoformable-composition-layer 212, and a little beyond, leaving the photoformed layer 222 deformable at this interface and forming a deformable-composition-release-coating, even after exposure, further decreasing any chemical, mechanical, hydrogen, or like bonding, and therefore providing easier sliding of the film 202 from this interface after exposure. It is also preferred that air or oxygen, or other permeated inhibitor 242, be substantially dissolved in the permeated-deformable-release-coating 210 and that the deformable-coating-mixture 210' aid in transfer of the air or oxygen, or other dissolved inhibitor 242', through the film 202 by diffusion means. It has been shown, by others familiar with the art of diffusion, that gases penetrate more readily when they are more condensable and soluble in a liquid, especially in a liquid that permeates and swells a film. This swelling of the film, which increases the diffusion of the deformable-coating-mixture, and in the preferred case, increases the diffusion of soluble oxygen in the deformable-coating-mixture, through the film, is a different transport mechanism from just capillary action, as might occur through, for example a porous fused silica plate, which is not capable of swelling.

The presently preferred deformable-coating-mixture which has all the above preferred properties, when used in combination with the preferred fluoroelastomer film, is Fluorinert TM FC-40 (3M, St. Paul, MN). Fluorinert TM Liquids are manufactured by electrolyzing an organic compound in liquid hydrogen fluoride. The fluorination is complete. FC-40 has a molecular weight of 650. Fluorinert TM is immiscible in all photoformable compositions tested to date, however, it can contain 37 ml of oxygen per 100 ml of Fluorinert TM without affecting the optical clarity of the coating. The liquid is very non-polar and therefore has high surface tension when in contact with the typically more polar photoformable compositions. It permeates the film quickly. Preferably, the film is first saturated with the Fluorinert TM overnight, prior to assembly in the frame. The Fluorinert TM has low viscosity and provides a slippery feel on the surface of the film. Referring to FIG. 2, in the case of the transfer solution 211, FC-40 is preferred, however, other Fluorinert TM liquids, such as for example, FC-72 are more preferred since these liquids can contain a greater concentration of oxygen and therefore enhance the diffusion of oxygen through the porous tube 238.

Following are the results of a test run with the preferred film and FC-40 in combination with TE-1541: Approximately 20 ml of FC-40 was placed in a beaker. The fluoroelastomer film was stretched over the top of the beaker and clamped around the edges to form a drum. The beaker was then inverted, allowing the FC-40 to be fully supported by the film in the beaker. The beaker in this position was placed in such a manner as to immerse the film surface, outside the beaker, in another beaker of TE-1541. The beakers were left in this position for several months. Although FC-40 has a very high specific gravity of 1.87 at 25° C., high surface tension when in contact with photoformable compositions, and immiscibility with these compositions, the FC-40 passing through the film never accumulated at the bottom of the TE-1541 beaker and never showed evidence of forming globules or drops.

The Applicants' propose the following mechanisms as a possible explanation for the results obtained. However, this proposal is merely a suggestion, and it must be taken only as such by the reader. By no means should the Applicants' proposal be construed as limiting in any way the breadth and scope of this invention. The Applicants propose that:

The FC-40 wets and swells the film very easily. Initially there is a high concentration of FC-40 on one side of the film. Since the film is permeable to the FC-40 and swelled by it, diffusion effects develop and transport the liquid to the other side of the film which is in contact with the composition. Since there are high surface tension effects between the FC-40 and the composition, the FC-40 tends to minimize its surface area forming a thin coating of liquid on the composition side of the film. This in turn creates a high concentration of FC-40 on the composition side of the film, thereby substantially equilibrating the concentration difference on either side of the film and diminishing any diffusion and transport effects. In this way, it can be expected that only a thin coating of FC-40 will form on the composition side. If any of this coating should be sloughed off during the step of sliding the film from the surface of the photoformed layer, the diffusion will automatically refresh the permeated coating.

The above described self-replenishing release coating method has also been tested in conditions where the FC-40 and film were at the bottom. In either case, the FC-40 permeates the film and forms a coating on the composition side of the film, through which an exposure can be made to create a photoformed layer which can then be slid on the surface of the film. The significance of orientation of the assembly is an important point in the application of this invention. In the case described by the Applicants, a heavier liquid FC-40 was on top of the lighter liquid photoformable composition. With this invention, the specific gravity of the liquid does not affect the desired results for creating a release of a photoformed layer from the surface of the film. That is, the invention's method of film orientation can be any method convenient for production of the layers or three-dimensional objects.

Any combination of film, composition and coating material may conceivably be used in which a similar balance of properties exist. Many plasticizers of films permeate the film and are transported through it by these methods. And many of these combinations of photoformable composition, film, and deformable-coating-mixture may provide adequate performance in the production of photoformed layers and three-dimensional objects.

Surprisingly, use of just an inhibitor, for example, air or oxygen, which permeates through a film without the presence of a coating may be used. For example, experiments have been conducted by the Applicants' that show that a film can be slid from a photoformed layer that has been exposed with a mercury arc lamp through the film. In the Applicants' test, the fluoroelastomer film slid freely off an exposed Desolite SLR800 TM (DeSoto Chemical Corporation, Des Plains, IL) photopolymer layer. The Kalrez ® film exhibited a little more adhesion but could still be slid from the surface. The polyethylene film showed more adhesion and would not slide from the surface but could easily be peeled off. In each of these cases, the photopolymer surface at the film interface was slightly tacky. An additional sample was tested using Teflon AF ® (DuPont, Wilmington, DE) FPX/FC40 which had been coated on sandblast frosted ⅛" thick frosted quartz plate with a spiral wound #26 coating rod, then oven heated for about 12 minutes at 160°-170° C. to evaporate off the solvent. When the DeSoto SLR-800 TM liquid was exposed when in contact with the Teflon AF ® coated side, sliding of the layer from the glass was not immediately possible, (The Teflon AF ® has very low surface energy and is substantially inert, however, the sandblasted surface of the glass telescoped through the film creating a surface that provided good mechanical bonds. In addition, adhering the Teflon AF ® to a quartz plate prevents oxygen from permeating to the interface between the Teflon AF ® and the photopolymer.) and the surface of the photoformed layer was not at all tacky. The Applicants suggest that the relative film adhesion and surface tack of the photoformed layers is substantially dependent on the tendency of oxygen in air to permeate the film and inhibit the photopolymer.

Referring to FIG. 1, use of just a film 102 with an imaging atmosphere 156, such as for example, air or oxygen, which permeates through the film 102, diffuses into the photoformable composition 104, and which creates a deformable-composition-release-coating upon exposure is possible. (To the extent that these dissolved gases are photoformation inhibiting, the inhibited composition remains deformable after exposure and is therefore acting as a deformable-composition-release-coating.) Likewise, use of just a film 102 held to a particular shape, with a deformable-coating-mixture 110', and with or without an inhibitor 142' on the first surface of the film 102', which permeates the film 102 and creates a permeated-deformable-release-coating 110 (and/or a deformable-composition-release-coating) on the film second surface 102" is possible. Referring to FIG. 2, when the film 202 is held to a particular shape by a plate 232, the deformable-coating-mixture 210' is preferred, in conjunction with dissolved inhibitors 242', since it creates substantially improved optical coupling between the film 202 and the plate 232 and therefore allows formation of more precise photoformed layers 222.

It is possible to use a film that is only partially in contact with and partially adhered to a plate. For example, one surface of the plate may be sandblasted or in some way have a roughened surface, and the film could be partially adhered to the plate by, for example, an adhesive, or, for example partial melting to the high spots in the plate. The fluorelastomer film would be particularly suitable for such an application since it is a thermoplastic. With this method, the film surface facing the composition could be smooth enough to prevent mechanical bonding and allow sliding from the photoformed layer surface. The regions between the film and the plate that are not in contact would create channels through which the deformable-coating-mixture and/or inhibitors could pass to wet and permeate the film. It might be possible to use a porous fused silica plate that would allow, for example, oxygen to pass but not allow photoformable composition to pass and inhibit the interface between the plate and the composition during exposure of a photoformed layer. It would be preferred to improve the optical quality of such a porous plate by utilizing a deformable-coating-mixture, capable of filling the pores of the plate, such deformable-coating-mixture having substantially the same refractive index as that of fused silica for the radiation in use. Silicone oil compounds such as Laser Liquids TM (R. P. Cargille Laboratories, Cedar Grove, NJ) may prove useful in this application. Such a porous plate, could be made from, for example, silica frit or glass microballs, of good optical quality, that have been sintered together to form the plate shape. It might be preferred to, for example, use a porous fused silica plate with a partially bonded film, such as for example, silicone films, for this method. It would be more preferred to use a deformable-coating-mixture with a dissolved inhibitor, which provides substantially the same refractive index as that of the porous fused silica plate, which fills the pores in the plate, thereby improving its optical clarity for the wavelength in use, and which permeates the film, thereby forming a permeated-deformable-release-coating on the photoformable composition side of the film, and also forms a deformable-composition-release-coating on the photoformed layer upon exposure thereby allowing sliding of the film/plate from the photoformed layer surface.

Figure 3:
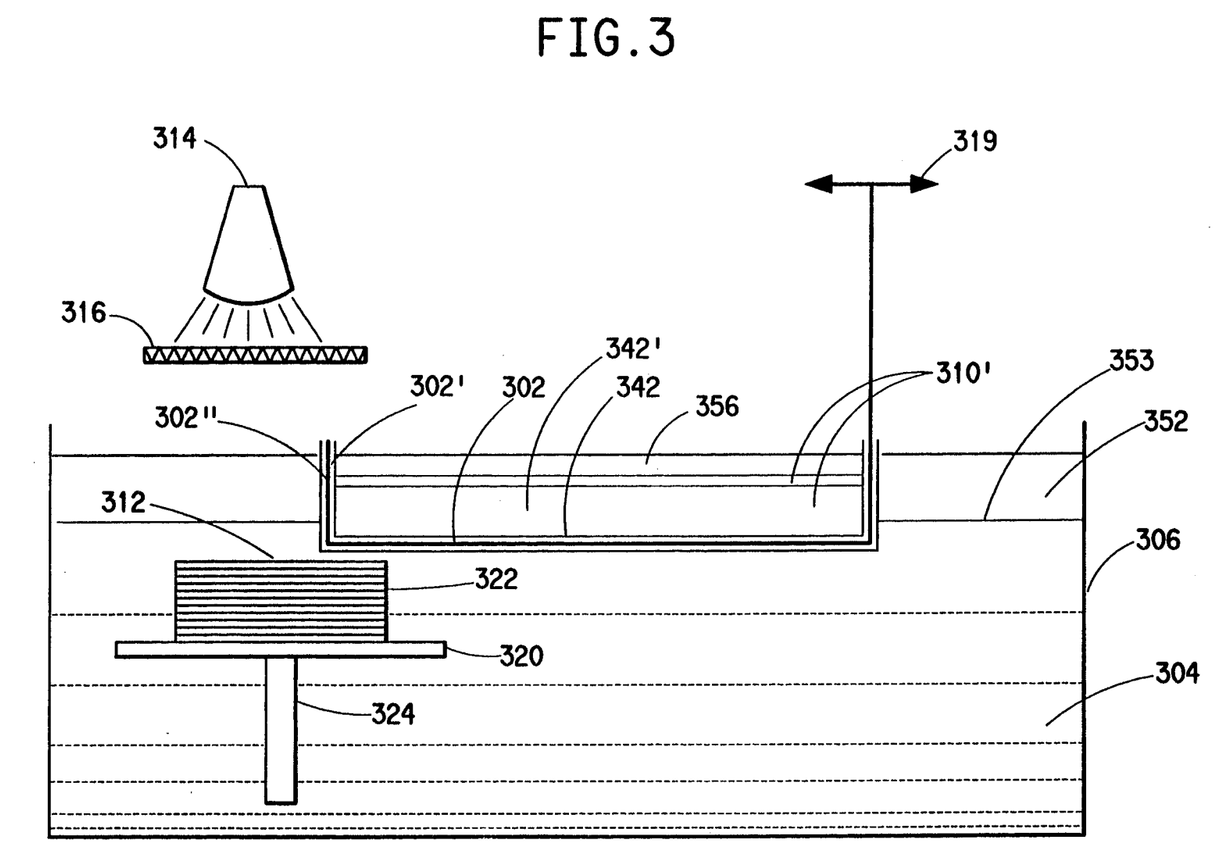
FIG. 3 depicts an embodiment utilizing a porous plate with a partially adhered semi-permeable film in the process of separating the film and coating from the photoformed layer.

FIG. 3 depicts an embodiment utilizing a porous plate 333 with pores filled as described above by a deformable-coating-mixture 310'. Partially adhered to the porous plate 333 is a film 302, having a first surface and a second surface, with the film second surface 302" positioned to, at least partially, face the photoformable composition 304 and the film first surface 302', at least partially, facing and partially adhered to the porous plate 333. This porous plate 333 with partially adhered film 302 will hereinafter be referred to as a plate assembly. In addition, the film 302 wraps around the edges of porous plate 333 assisting in containing the deformable-coating-mixture 310'. The deformable-coating-mixture 310' wets and permeates the film 302 forming a permeated-deformable-release-coating 310. Above the deformable-coating-mixture 310' and porous plate 333 is an imaging atmosphere 356, which contains an inhibitor, and which may or may not be the same as the composition atmosphere 352, which is in contact with the photoformable composition 304, at the composition/atmosphere interface 353, within a vat 306. The imaging atmosphere 356 may diffuse into the deformable-coating-mixture 310' forming a dissolved inhibitor 342', which then permeates through film 302 forming a permeated inhibitor 342. Also, within the vat 306 is a platform 320, which is translated in a direction substantially normal to the film second surface 302", during the production of photoformed layers 322, by platform translation means 324. Plate assembly translation means 319 (shown just as an arm with arrows for the sake of clarity) translates the plate assembly and deformable-coating-mixture 310' in a direction substantially parallel to the film second surface 302". Radiation source 314 exposes the photoformable-composition-layer 312 through a photomask 316, the transparent deformable-coating-mixture 310', the film 302, the porous plate 333, and the permeated-deformable-release-coating 310 in much the same manner as described in other figures. It would be preferred in the practice of this embodiment, when the deformable coatings are in the form of a low viscosity liquid, that the plate assembly be substantially horizontal.

In operation, the plate assembly would initially be positioned over the platform 320 forming a photoformable-composition-layer 312 between the platform 320 and the permeated-deformable-release-coating 310. Radiation source 314 would then be turned on creating radiation imagewise to pass through photomask 316, the deformable-coating-mixture, the plate assembly, the permeated-deformable-release-coating, and into photoformable-composition-layer 312, thereby creating a photoformed layer 322 and a deformable-composition-release-coating due to the presence of permeated inhibitor 342. After exposure, the plate assembly would be translated by plate assembly translation means 319, separating the film 302 from the surface of layer 322 and allowing new photoformable composition 304 to flow into this region of separation. After the separation is complete, the platform 320 and the photoformed layer 322 are translated a distance of at least one photoformable-composition-layer 312 from the plate assembly. Next, the plate assembly is positioned above the platform 320 and previous photoformed layer 322 forming a new photoformable-composition-layer 312 between the permeated-deformable-release-coating 310 and the previous photoformed layer 322. The imagewise exposure, separation, platform translation and recoating steps would continue as above until a complete three-dimensional object is fabricated.

It is preferred for the production of three-dimensional objects that the exposure by radiation be performed imagewise, which image represents a layer of a three-dimensional object. And it is preferred that the first exposure step, as described above, be adequate to create adhesion between portions of a photoformed layer and a platform, thereby ensuring substantial support for the layer, ensuring substantial subsequent static registration with the imagewise radiation, and ensuring controlled relative position between the previously photoformed layer and the film surface, between which the photoformable-composition-layer would exist. It is further preferred that subsequent exposure steps be adequate to ensure adhesion between portions of the photoformable composition being exposed and portions of the surface of a previously exposed photoformed surface. The presently preferred exposure method utilizes UV light exposure through or reflected from an appropriate photomask, however, other radiative exposure methods, such as, for example, direct writing using a focused scanning laser beam, x-rays, microwave or radio-frequency wave excitation, and the like may be used, assuming such radiation induces photoforming of the photoformable composition. Photomasks useful for the practice of this invention may be silver halide films (either transmitted through or backed by a mirror and reflected through), liquid crystal cells (reflective or transmissive), electrostatically deposited powders on a transparent web, ruticons, etc.

It has been found by the Applicants that the use of a focused beam from a relatively high power laser as the exposure source yields results that create more adhesion of the photoformed layer to films through which they were exposed when air is the imaging atmosphere. The Applicants believe this is due to the polymerization rate outrunning the inhibition rate. Use of thinner films, faster inhibitors, or for example, more concentration of oxygen, and/or, for example, oxygen saturated permeated-deformable-release-coatings would be preferred since they would substantially decrease the adhesion of the films to photoformed layers.

Sliding of the film, and more preferably the film, plate and coatings assembly, from the surface of a photoformed layer is preferred to reduce the build-up of vacuum forces that might occur during separation of the film and photoformed layer. Even more preferred, would be sliding the film, or assembly, to a region where there is a substantially sharp change in the shape of the film, or assembly, such that the surface of the film is no longer parallel to and moves sharply away from the photoformed layer surface, allowing the photoformable composition substantially unrestricted flow into the region where the photoformed layer and film separate. It is preferred that such a substantial change in film shape, for an assembly, occur at the edge of the plate. And as shown in FIG. 2, it is most preferred that such film 202 shape change occur as a recess 228 ground into or originally formed in the plate 232, which recess 228 is deep enough to allow substantially unrestricted flow of composition 204 into the region where the film 202 and photoformed layer 222 separate.

Occasionally, during the practice of the preferred invention, it may be necessary to perform a replenishing step which involves re-saturating the film with the deformable-coating-mixture. Typically during this step, the vacuum pressures which draw the deformable-coating-mixture from between the film and the glass are relieved and excess deformable-coating-mixture is pumped or allowed to flow into this region. Even more preferable is to first bubble air or pure oxygen through the deformable-coating-mixture in a separate flask, thereby re-saturating the deformable-coating-mixture with dissolved inhibitor and then to allow this (inhibitor saturated) deformable-coating-mixture to re-saturate the film. The Applicants suggest that this re-saturation step may be necessary as often as every ten exposures. However, this depends substantially on, for example, the amount of exposure provided, the area of the layer being imaged and, for example, the type of photoformable composition in use. In the preferred method as shown in FIG. 2, where an exposure and recoating of photoformable-composition-layer 212 occur each time the layers pass over a recess, it is even more preferred that the film 202 and plate 232 on each side of the recess region 228 create two separate chambers 250' and 250 so that when one side provides the exposure step, the other side is being re-saturated.

Pre-saturating the film prior to assembly allows the system to be used sooner and avoids loss of tension in the film due to film swelling, however this step is not required. It is preferred that the deformable-coating-mixture be introduced between the film and the plate a few hours before use to allow the deformable-coating-mixture to permeate the film. The Applicants have found that the presence of photoformable composition on the proper side of the film substantially speeds the diffusion process and the creation of a permeated-deformable-release-coating. The deformable-coating-mixture need not be placed under pressure to aid the diffusion process, though this is possible. Typically, the deformable-coating-mixture is introduced into the region between the glass and film using just head pressures, however, many kinds of pumps or, for example, pressure chamber devices, or for example, bladder pumps may be used. It is preferred to draw the deformable-coating-mixture from the film and glass after permeation using vacuum since this causes the film to tightly register with the glass during the imaging step. The vacuum is usually created by drawing the air or oxygen from a chamber that contains the deformable-coating-mixture and is connected to the film/glass/deformable-coating-mixture assembly. However, any vacuum method, well known in the art may be used. Since, the deformable-coating-mixture in the preferred method is FC-40, which has a high specific gravity, even the use of low head pressures may be used to draw the deformable-coating-mixture out. When the deformable-coating-mixture is drawn out between the film and the glass, there is still a substantial amount of deformable-coating-mixture left between the two. This is due to viscosity and flow resistance effects that compete with the drawing out vacuum.

After the exposure step, sliding of the assembly, parallel to the second film surface and relative to the previously formed layers, can be performed prior to translation of the platform and layers one or more layer thickness away from the plate. It is preferred, however, to first translate the platform and previously formed layers away one layer thickness prior to sliding of the assembly.

It may be possible to translate the platform away from the plate more than one layer thickness and then move the platform back to a one layer thickness position during each layer formation step, but this is not preferred. If a roughened plate or a porous fused silica plate, with a partially adhered film is used, however, it is preferred that the sliding translation occur prior to platform translation.

The special materials of construction usually chosen as shown in FIG. 2 that have not been described heretofore are listed as follows. This in no way should be perceived as a limitation of possible materials that could be used rather the information is being provided to aid others of ordinary skill in the art to construct such an assembly:

Tube Screen- Aluminum, steel or copper screen, with sharp points removed or turned inward, which has been rolled to the proper diameter and sewn, soldered, or brazed at the seam.

Flexible Tubing- Tygon® Tubing (VRW Scientific, San Francisco CA)

Translation Means- Unidex XI motor controller, ATS-206-HM-6" Travel Positioning Motor Driven Stage W/Stepper Motor and Home Marker,(Aerotech, Pitts. PA).

What is claimed is:

1. A method for fabricating an integral three-dimensional object from successive layers of a photoformable composition comprising the steps of:
   a) positioning a substantially transparent, composition-inert, composition-impermeable, semi-permeable film, said film being permeable to an imaging atmosphere and having a first surface and a second surface, such that said first surface is, at least partially, in contact with said imaging atmosphere, and said second surface is, at least partially, in contact with the photoformable composition;
   b) contacting an interface of said composition with a composition atmosphere;
   c) allowing said imaging atmosphere to permeate through said film and partially into a photoformable-composition-layer;
   d) exposing said photoformable-composition-layer to radiation imagewise through said film making a photoformed layer and a deformable-composition-release-coating;
   e) sliding said film relative to said photoformed layer in order to separate said film from said photoformed layer;
   f) positioning said film in such a way as to form a photoformable-composition-layer between said previously made photoformed layer and said film second surface; and
   g) repeating steps c–f until said layers of the integral three-dimensional object are formed.

2. A method for fabricating an integral three-dimensional object as recited in claim 1 wherein said film has molecular weight cutoff pores and said film does not substantially wet said composition.

3. A method for fabricating an integral three-dimensional object as recited in claim 1 wherein said film has expandable pores and said film does not substantially wet said composition.

4. A method for fabricating an integral three-dimensional object as recited in claim 1 wherein said film is elastomeric and does not substantially wet said composition.

5. A method for fabricating an integral three-dimensional object as recited in claim 4 wherein said film is a fluoroelastomer.

6. A method for fabricating an integral three-dimensional object as recited in claim 1 wherein both said imaging atmosphere and said composition atmosphere are air.

7. A method for fabricating an integral three-dimensional object as recited in claim 1 wherein said imaging atmosphere comprises oxygen in a concentration higher than that normally found in air.

8. A method for fabricating an integral three-dimensional object as recited in claim 1 wherein said composition atmosphere comprises an inert gas in a concentration higher than that normally found in air.

9. A method for fabricating an integral three-dimensional object from successive layers of a photoformable composition comprising the steps of:
   a) positioning a substantially transparent, composition-inert, composition-impermeable, semi-permeable film, said film being permeable to an imaging atmosphere and having a first surface and a second surface, with said second surface at least partially in contact with the photoformable composition in a vat;
   b) holding said film to a substantially flat shape with a tenter frame such that a substantially sharp change in shape of said film is formed at an edge of said tenter frame;
   c) contacting said film first surface, at least partially, with said imaging atmosphere,
   d) contacting an interface of said composition with a composition atmosphere;
   e) forming a photoformable-composition-layer between a platform and said film second surface;
   f) allowing said imaging atmosphere to permeate through said film and partially into said photoformable-composition-layer;
   g) exposing said photoformable-composition-layer to radiation imagewise through said film, thus making a deformable-composition-release-coating and a photoformed layer that is substantially adhered to said platform, or to a previously photoformed layer;
   h) sliding said tenter frame and film relative to said photoformed layer past said substantially sharp change in shape in order to separate said film from said photoformed layer;
   i) positioning said tenter frame and film forming a photoformable-composition-layer between said film and said previously photoformed layer; and
   j) repeating steps g–i until said layers of the integral three-dimensional object are formed.

10. A method for fabricating an integral three-dimensional object from successive layers of a photoformable composition comprising the steps of:
   a) positioning a substantially transparent, composition-inert, composition-impermeable, semi-permeable film, said film being permeable to a deformable-coating-mixture and having a first surface and a second surface, with said second surface at least partially in contact with the photoformable composition in a vat;
   b) holding said film to a substantially flat shape with a tenter frame such that a substantially sharp change in shape of said film is formed at an edge of said tenter frame;
   c) contacting said film's first surface, at least partially, with said deformable-coating mixture which in turn is in contact with an imaging atmosphere capable of dissolving in said deformable-coating-mixture;
   d) contacting an interface of said photoformable composition with a composition atmosphere;
   e) allowing said deformable-coating-mixture and said dissolved imaging atmosphere to permeate through said film forming a permeated-deformable-release-coating between said film and said composition,
   f) forming a photoformable-composition-layer between said permeated-deformable-release-coating and a translatable platform, said platform adapted to be translated in a direction substantially normal to said second surface of said film;
   g) exposing said photoformable-composition-layer to radiation imagewise through said film, deformable-coating-mixture, and permeated-deformable-release-coating creating a deformable-composition-release-coating and a photoformed layer that is substantially adhered to said platform, or to a previously photoformed layer;
   h) sliding said tenter frame, film, and deformable-coating-mixture relative to said photoformed layer past said substantially sharp change in shape in order to separate said film from said photoformed layer;
   i) positioning said tenter frame, film, deformable coating mixture, and permeated deformable release coating such that a photoformable-composition-layer is created between said permeated-deformable-release-coating and said previous photoformed layer; and
   j) repeating steps g–i until said layers of the integral three-dimensional object are formed.

11. A method for fabricating an integral three-dimensional object from successive layer of a photoformable composition comprising the steps of:
   a) positioning a substantially transparent, composition-inert, composition-impermeable, semi-permeable film, said film being permeable to a deformable-coating mixture and having a first surface and a second surface, with said second surface at least partially in contact with the photoformable composition in a vat;
   b) securing in a frame said film such that said film's first surface is disposed against a first surface of a transparent plate, said plate's first surface having a recess disposed at an edge thereof;
   c) introducing said deformable-coating-mixture between said plate and said film;
   d) contacting an interface of said photoformable composition with a composition atmosphere;
   e) allowing said deformable-coating-mixture to permeate through said film forming a permeated-deformable-release-coating between said film and said composition;
   f) drawing said deformable-coating-mixture from between said film and said plate such that said film and said permeated-deformable-release coating substantially conforms to said plate's first surface and such that a substantially sharp change in shape of said film is formed at said edge of said plate's first surface;

g) forming a photoformable-composition-layer between a translatable platform and said permeated-deformable-release-coating, said platform adapted to be translated in a direction substantially normal to said first surface of said plate; exposing said photoformable-composition-layer to radiation imagewise through said plate, deformable-coating-mixture, film, and permeated deformable release coating such that portions of a photoformed layer are substantially adhered to said platform, or a previously photoformed layer;

i) sliding said frame, plate, film, and deformable coating mixture relative to said photoformed layer past said edge of said plate and past said substantially sharp change in shape of said film while replenishing said deformable-coating-mixture between said film and said plate;

j) drawing said deformable-coating-mixture from between said film and said plate such that said film and said permeated-deformable-release-coating substantially conforms to said plate's first surface;

k) positioning said frame, plate, film, deformable-coating-mixture, and permeated-deformable-release-coating such that a photoformable-composition-layer is formed between said permeated-deformable-release-coating and said previously photoformed layer; and l) repeating steps h-k until said layers of the integral three-dimensional object are fabricated.

12. A method for fabricating an integral three-dimensional object from successive thin layers of a photoformable composition comprising the steps of:

a) position a substantially inert, transparent, and composition-impermeable, semi-permeable film, said film being permeable to a deformable-coating-mixture and having a first surface and a second surface, such that said first surface is partially adhered to a surface of a porous plate, having an edge, and said second surface is, at least partially, in contact with the photoformable composition;

b) filling the pores of said porous plate with said deformable-coating-mixture and wetting said film first surface with said deformable-coating-mixture;

c) allowing said deformable-coating-mixture to permeate through said film forming a permeated-deformable-release-coating between said film and said photoformable composition;

d) forming a photoformable-composition-layer between said permeated deformable release coating and a translatable platform, said platform adapted to be translated in a direction substantially normal to said surface of said porous plate;

e) exposing said photoformable-composition-layer to radiation imagewise through said porous plate, film, deformable-coating-mixture and permeated-deformable-release-coating such that portions of a photoformed layer are substantially adhered to said platform, or a previously photoformed layer;

f) sliding said porous plate, film, and deformable-coating-mixture relative to said photoformed layer past said edge of said plate;

g) positioning said porous plate, film, deformable-coating-mixture, and permeated-deformable-release-coating making a photoformable-composition-layer between said permeated-deformable-release-coating and said previous photoformed layer; and h) repeating steps e-g until said layers of the integral three-dimensional object are fabricated.

* * * * *